April 21, 1959

W. J. SMITH 2,883,053

JIG

Filed Dec. 27, 1955

INVENTOR;
WILLIAM J. SMITH,
BY
ATT'Y.

April 21, 1959

W. J. SMITH 2,883,053

JIG

Filed Dec. 27, 1955

INVENTOR;
WILLIAM J. SMITH,
BY

ATT'Y.

United States Patent Office 2,883,053
Patented Apr. 21, 1959

2,883,053

JIG

William J. Smith, Worthington, Ohio, assignor to The Jeffrey Manufacturing Company, a corporation of Ohio Application December 27, 1955, Serial No. 555,629

1 Claim. (Cl. 209—493)

The instant invention relates to a jig which is adapted to operate on a raw material having a useful product component and a secondary product component to separate said components in the jig by a stratification process.

It is an object of the instant invention to provide an improved form of jig including means for separating certain waste materials contained in the raw material fed to the jig.

It is another object of the instant invention to provide a jig having means for separating certain waste materials from the material fed to the jig, which waste materials are of such nature that they float on the surface of the jigging fluid.

In accordance with the objects of the instant invention there is provided a screen basket located ahead of the feed chute of the jig in the path of flow of the fluid from the feed chute so that waste materials floating on the surface of the jigging fluid will be directed into the basket and caught therein, thereby separating such floating waste materials from the raw material being fed into the jig for separation of the useful product in the raw material from the other products thereof by stratification.

Other objects of the invention will appear hereinafter, the novel features and combinations being set forth in the appended claim.

Figures 1, 3:
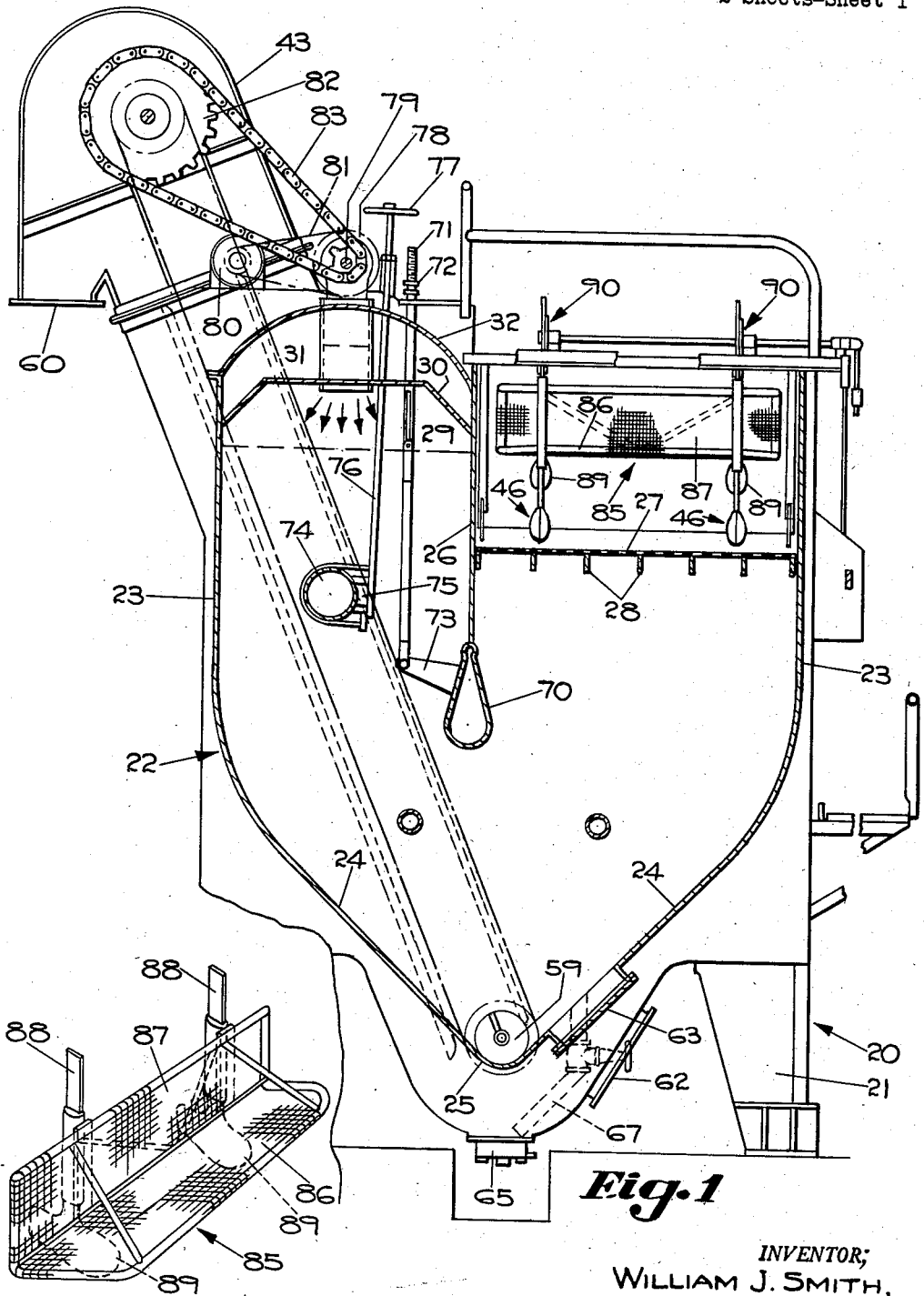
Fig. 1 is an elevational view in section of a jig including the instant invention.
Fig. 3 is a perspective view of the screen basket of the instant invention.

Referring to the drawings, it will be seen that I have provided a jig of the Baum type with a main frame 20 having at its four corners support feet 21 adapted to rest on a floor or other supporting structure of the cleaning plant.

Mounted on the main frame 20 is a tank or container 22 which is formed by a pair of longitudinally extending upright side walls 23, which extend the full length of the jig and which have integral converging bottom walls 24, which meet to form a trough 25 in the bottom of the tank 22. Between the upright side walls 23 there is disposed a longitudinally and upwardly extending partition 26.

As is well understood in the art, the tank 22 receives the water or other jigging fluid, and the cross sectional structure of the tank 22, as clearly illustrated in Fig. 1 of the drawings, with the fluid contained therein, is formed into a U-shaped column. In one leg of the column, between the partition 26 and one side wall 23, there is a perforated plate or screen 27, having a plurality of re-enforcing bars 28 on the bottom thereof. Above the other leg of the water column is formed an air chamber 29 between the partition 26 and the other upright side wall 23, which chamber 29 is provided by a top plate 30, which also constitutes the bottom plate of a plenum chamber 31 extending the full length of the jig. The side walls of the plenum chamber 31 are formed by the top of the partition 26 and the top of the other of the aforementioned side walls 23, and the top of the chamber 31 is formed by a longitudinally extending arched top plate 32. Air under pressure is delivered to the plenum chamber 31 from a blower, compressor, or the like, by way of pipe 33.

While there is illustrated in the drawings a jig having two stratifying compartments, 34, 35, it is evident that the number of compartments may be either increased or reduced. The two stratifying compartments of the jig are essentially the same in structure except for certain minor differences, and one of the stratifying compartments is indicated generally by the reference character 34, the other by the reference character 35. Except where a contrary fact is indicated, the two stratifying compartments 34 and 35 have the same construction.

The compartment 34 is provided with a feed chute 36 by which raw coal or other material to be treated is fed to the jig. Between the compartments 34 and 35 is a weir 37 over which the clean coal from compartment 34 flows to compartment 35. The clean coal from compartment 35 is discharged over weir 38 and down in chute 39 to an appropriate receiving means such as a sluiceway.

The herein described screens 27 associated with the two compartments 34 and 35 are pivotally attached at their forward ends to partitions, one of which is seen at 40, forming part of a casing 41 for a refuse elevating conveyor 42 associated with the compartment 35. Compartment 34 is provided with a similar elevating conveyor casing 43 and a refuse removing elevating conveyor enclosed thereby.

Adjacent the forward end of each screen 27 is a refuse discharge opening 44 which leads to the refuse ejecting mechanism 45, which is automatically controlled by a float operated automatic refuse discharge regulating mechanism 46, the structure of which substantially follows that described in the patent to John G. Attwood, No. 2,132,380, for a Jig, dated October 11, 1938. The operating means for this refuse discharge mechanism 45 is driven by a crank 47 which in turn is driven from an electric motor 48, as shown in Fig. 2 of the drawings.

Figure 2:
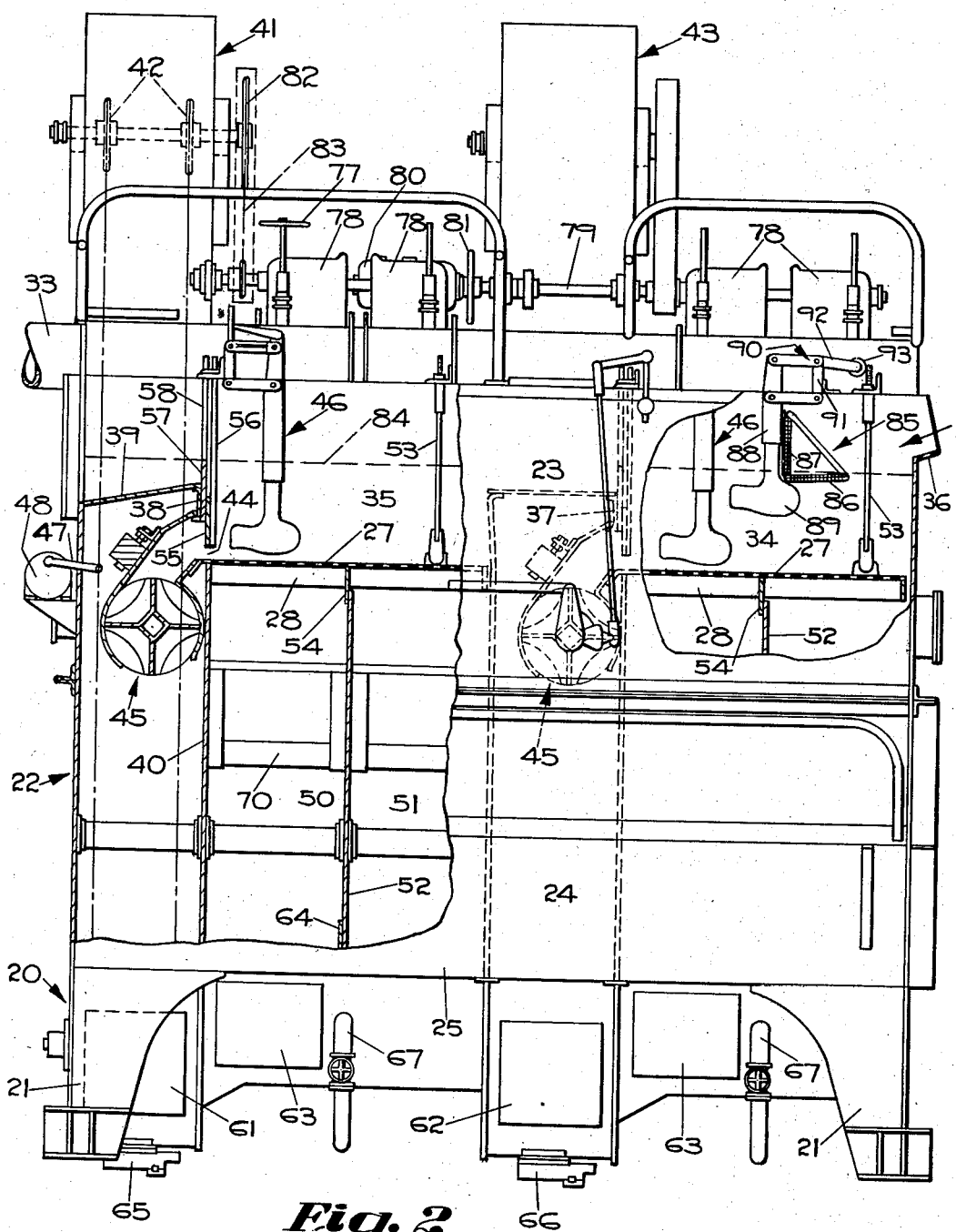
Fig. 2 is a front elevational view partly in section of the jig embodying the instant invention.

Each of the compartments 34 and 35 is preferably divided into a plurality of cells, and cells 50, 51 of compartment 34 are clearly seen by reference to Fig. 2 of the drawings. They are formed by a transverse partition 52 between the aforementioned partition 40 and a wall of the elevator casing 43.

Each of the aforementioned perforated plates or screens 27 is adjustable by adjusting hang rods 53, so that the slope of the screens may be varied. To provide for this adjustment while preventing leakage between the cells 50 and 51, each of the screens 27 carries a downwardly projecting plate 54 in overlapping relation with the partition 52. The effective size of the opening 44 leading to the refuse ejecting mechanism 45 may be adjusted by a vertically adjustable slide plate 55 provided with adjustable hang rods 56 at opposite ends thereof, and the effective height of the weir 38 may be adjusted by vertically adjustable weir plate 57 provided with adjustable hang rods 58 at opposite ends thereof. This construction is substantially identical for each of the compartments 34 and 35.

The bottom trough 25 of each of the compartments 34 and 35, is provided with a screw conveyor 59 which conveys the hutch material to the left, as viewed in Fig. 2 of the drawings, and discharges it into the boot of the associated elevator casing 41 or 43, where it is commingled with the refuse discharged thereinto by the associated refuse ejecting mechanism 45, and elevated by the elevating conveyors by which it is discharged from the discharge chutes of the elevator casings, the chute 60 being the one associated with the elevator casing 43.

The elevating conveyor casings 41 and 43 are provided with manhole openings covered by appropriate cover plates 61, 62, which of course provide access to the interior thereof. Access to the interior of each cell 50 is provided by a manhole opening having a cover plate 63, and once access is had to cell 50 access is then provided to cell 51 by a removable plate 64 associated with the partition 52. The boots at the bottom of the elevator casings 41 and 43 are provided with drain plugs 65 and 66, and the bottom of each compartment 34 and 35 is provided with a valve controlled drain pipe 67.

From the above description it is evident that the complete jig illustrated in the drawings comprises two similar compartments 34, and 35, each of which is provided with a pair of cells 50, 51 asociated with a single perforated plate or screen 27, by which the coal to be treated is supported and over which it moves during the operation of the jig.

It is desired to provide individually adjustable controls for each of the cells 50, 51, of which there will of course be four in the two compartment jig illustrated. Therefore, each of said compartments 50, 51 has an individual air chamber 29. Furthermore, each of said cells 50, 51 is provided with an adjustable flow plate 70, which is pivotally attached at its top to the bottom of the partition 26 and which is adjustable from outside the tank 22, by an adjusting rod 71, which is threaded at its upper end and provided with an adjusting nut 72, said rod 71 being pivotally attached to an arm 73, rigidly attached to the flow plate 70. The flow plate 70 is preferably in the form of a hollow pear in cross-section or in the form of a streamlined body having a generally tear drop configuration in cross-section, for a streamlined flow of fluid in the U-shaped water column to provide uniform action over substantially the entire lateral dimension of screen 27. It should be understood that the hollow plate 70 is elongated as shown in Fig. 2, as it forms a downward continuation of the partition 26 between the opposing walls of the compartment in which it is located.

In addition, water is supplied to each individual cell 50, 51 from a water main 74, by a water control valve 75, provided with an operating shaft 76, operable from the exterior of the tank 22 by a removable hand wheel 77, there preferably being only one hand wheel 77 for operating the four control valves, with one valve 75 being provided for each of the cells 50 and 51.

Associated with each of the cells 50, 51 is an individual rotary air valve 78. The four rotary air valves 78, are driven from a common drive shaft 79 which is driven from an electric motor 80 by an appropriate chain and sprocket driven mechanism 81. The aforementioned elevating conveyors are also driven from the drive shaft 79 through appropriate chain and sprocket mechanisms 82, 83.

In the operation of the jig, raw coal or other raw material to be treated for removing the impurities therefrom, is fed over the feed chute 36 to the compartment 34. In the operation of the jig water pulsations, forming the jig stroke, under the control of the rotary valves 78, should act uniformly on all parts of the bed of material to be treated. In order to average out to a smooth uniform pulsation by eliminating abnormal disturbances at one point in the bed, and "dead spots" at other points therein, each compartment 34, 35 is divided into two cells as illustrated at 50, 51 in Fig. 2. For each cell there is provided a controlling valve 78, and each cell is also provided with an adjustable flow plate 70 at the bottom of the central partition 26, under which the water moves from the pulsion chamber to the screen compartments. The adjustment of this flow plate 70 diverts the water to different parts of the screen compartment, as may be required for uniform action. Furthermore, each rotary valve 78 is provided with means for adjusting each period of expansion, exhaustion and compression, and therefore the expansion and compression may be adjusted for different periods.

It is thus seen that in each of the cells the periods of air inlet, expansion, exhaustion and compression successively follow, during which compressed air is allowed to flow into the chamber 29 and cause an upward movement of liquid through the screen 27 which continues during the expansion period, whereupon the chamber 29 is sealed and the compressed air therein expands to effect a pulsation to move the liquid through the screen 27 to the dotted line position at 84 in Fig. 2. The air is thereafter exhausted from the chamber 29 to permit the water in the U-shaped cell to flow downwardly through the screen 27. The cycle is completed with the compression period during which the chamber 29 is sealed and the air therein compressed by the water flowing downwardly through the screen 27. The same general cycle of operation takes place in each cell of each of the compartments 34 and 35 but it should be particularly noted that each cell is provided with a controlling valve structure 78 so that the expansion and compression periods for each cell may be different from each other and also from the expansion and compression periods of each of the other cells. In other words, the expansion period of each cell and the compression period of each cell are individually adjustable for the purpose of securing such adaptation to the bed of material being treated as will secure greatest efficiency.

Circulation water, pumped to the jig and passing through it, forms the conveying element in the jig. This flowing water moves the coal from the one compartment 34 to the next compartment 35 and thence to the outlet chute 39. The flow of this incoming water also affects the jig pulsations and the adjustment thereof is obtained by the valves 75, one of which is provided for each of the cells.

Overlapping connections 54 between the bottom of each screen and the upper edges of the walls 52 of the cells confines the upward pulsation of the jigging fluid to the individual cells when passing through the screen 27. The screen plates may be set in each compartment at the slope best suited to the type of refuse. In order to operate the jig at maximum effective capacity, a uniform refuse bed should be maintained. Not only are the slopes of the screen plates adjusted but the automatic refuse ejecting mechanism 45 must also be adjusted so that the refuse is drawn off at the same rate as it accumulates on the screen. The float control mechanism 46 controls the operation of the refuse ejecting mechanism 45 and the greater the rate of refuse accumulation on the screens 27, the faster becomes its rate of removal due to the rise of the float control mechanism 46 which increases the rotations of the refuse ejecting mechanism 45.

Each perforated plate or screen 27 is provided with a plurality of reinforcing bars 28 on the bottom thereof to minimize "breathing" or bending movements of the screen plate. It is desirable to maintain the upper surface of each screen plate perfectly flat as such "breathing" tends to throw the refuse accumulated on the screen up into the higher stratified layer of material. Also, the upper surfaces of the screen plates 27 are smooth and unobstructed to assure free sliding of the refuse over the same to the ejectors 45.

At the material delivery end of the jig, ahead of the feed chute 36, there is disposed a screen basket 85 consisting of a substantially horizontal shaft portion 86 and a vertical back portion 87. The screen basket 85 faces towards the feed chute 36 and is so disposed that the shelf portion 86 is located immediately below and adjacent to the surface 84 of the jigging fluid in the compartment 34. The back portion 87 of the screen basket 85 is rigidly secured to upright members 88 which extend upwardly from a pair of floats 89. The floats 89 are disposed below the shelf portion 86 of the screen basket 85 within the body of the jigging fluid. The tops of the upright members 88 are pivotally secured to a parallel linkage 90 which is mounted on a fixed support 91. The parallel linkage 90 permits the upright members 88 to rise and fall while maintaining said members 88 vertical. The parallel linkage 90 includes a laterally extending arm 92 carrying a weight 93 at its extremity for the purpose of counterbalancing the weight of the upright members 88, the floats 89 and the screen basket 85.

In the operation of the jig it is desirable that the shelf portion 86 of the screen basket 85 be maintained immediately below the jigging fluid surface 84 and adjacent thereto as illustrated in Fig. 2. The float 89 functions to maintain the position of the shelf 86 constant with respect to the jigging fluid level 84 irrespective of the rise and fall of the fluid level in response to the pulsations of the fluid in the jigging compartment 34. The counterbalancing weight 93 is of such value as to provide the requisite force for counterbalancing the structure to achieve the desired operation as aforementioned. The floats 89 are disposed at such distance below the fluid level 84 that they are located in the strata of useful material that is separated from the raw material fed to the jig, and this stratified material will also assist to support the floats 89 and the associated mechanism, for maintaining the position of the shelf portion 86 of the screen basket 85 constant relative to the surface of the jigging fluid.

The raw material fed to the jig through the feed chute 36 contains certain constituents, especially wood, which are waste products and which float on the surface of the jigging fluid. The flow of the fluid in the jigging compartment 34 is from the feed chute 36 towards the weir 37 and the material discharging means. This current of the jigging fluid carries the floating waste products towards and into the screen basket 85 where the products are caught and separated from the material which is to be stratified. From time to time as the waste material accumulates in the screen basket 85 it is removed and discarded, access being had to the screen basket 85 through the feed chute 36.

The shelf portion 86 of the screen basket 85 is located a short distance ahead of the feed chute 36 so that when the raw material is fed in through the feed chute, the components thereof which are to be acted upon in the stratification process drop away from the surface 84 of the jigging fluid while the floating waste components of the raw material are carried on the surface of the jigging fluid to the screen basket 85. There is thus provided an initial separation in which the floating waste components are separated from the remainder of the raw material.

The jigging action is effective to stratify the bed of material on the screen 27 with the high gravity refuse in the bottom stratum. The refuse ejecting mechanism 45 and float operated refuse discharge mechanism 46 cooperate to maintain a substantially constant bed depth of high gravity refuse on the screen 27 of compartment 33 as it is formed, by ejecting said high gravity refuse substantially at the rate it forms. The ejected refuse is received in the boot of elevator casing 42 from which it is elevated and discharged by elevator 43. The material in the upper strata will pass over the weir 37 of compartment 34 with the water, into the compartment 35 where it is supported on screen 27 and subjected to further jigging action with the ultimate discharge of the refuse into the boot of the elevator casing 41 by way of opening 44, with the clean useful product, and of course some water, flowing over the adjustable weir plate 57 and down the chute 39 to the receiving sluiceway. All the while this jigging action is taking place an adjustable amount of water is being fed to each cell 50 and 51 of each compartment 34 and 35, and the flow plates 70 of each cell are adjusted to the position at which they give best results.

In general the treatment to be given the material in compartment 35 is different from that desired in compartment 34 due to the difference in the specific gravity of refuse which is to be removed, and consequently there will be a different valve setting for the valves 78 associated with the compartment 35 from that of the valves 78 associated with the compartment 34. It is also evident that this adjustment may be provided for the two valves 78 associated with the cells 50 and 51 of compartment 35.

The jig described herein is particularly useful for stratifying raw material that contains coal as the useful product and a high gravity refuse such as pyrite and shale. In the operation of the jig the coal will be stratified in the upper layer while the high gravity refuse will form the bottom strata. The raw material from which the coal is to be separated contains a substantial amount of wood fragments from the mine timbers, wedge parts, etc., and it is desired that the wood be separated from both the coal and the waste refuse. The instant invention performs this function of removing the wood, as well as any other waste materials that float on the jigging fluid, from the materials being stratified. In the operation of the invention the floating materials are carried into the screen basket by the current of the jigging fluid and thereby segregated from the material being stratified. From time to time these waste materials can be removed from the screen basket as they accumulate therein.

Obviously those skilled in the art may make various changes in the details and arrangement of parts without departing from the spirit and scope of the invention as defined by the claim hereto appended, and applicant therefore wishes not to be restricted to the precise construction herein disclosed.

Having thus described and shown an embodiment of the invention, what it is desired to secure by Letters Patent of the United States is:

A jig including a jigging tank having a screen on which material is stratified by pulsating fluid flow therethrough, a hutch compartment below said screen, a feed chute at one end of the jigging tank for delivery of materials to be stratified to a stratification chamber above the screen, jigging fluid in the tank and means for applying pulsations to the fluid to stratify the material above the screen, means for discharging the stratified materials located at the end of the stratifying chamber opposite the feed chute, the jigging fluid flowing away from the feed chute towards the discharging means, a parallel linkage secured to a fixed support, an upright member depending from the parallel linkage and supported thereby for rising and falling movement in an upright plane, said upright member terminating at its lower end in a float means completely submerged in the jigging fluid ahead of the feed chute, said parallel linkage means constraining the float means to rising and falling movement in an upright plane, a screen basket supported by the float means and secured to the upright member immediately below the surface of the fluid in the path of the flowing fluid, said float means causing the basket to rise and fall in an upright plane in response to the pulsations of the fluid and maintaining the basket immediately below the surface of the fluid, materials floating on the surface of the jigging fluid being caught in the basket and separated from the material to be stratified.

References Cited in the file of this patent

UNITED STATES PATENTS

| | | |
|---|---|---|
| 2,132,750 | Muller | Oct. 11, 1938 |
| 2,281,827 | Cappellanti | May 5, 1942 |
| 2,569,160 | Giesen | Sept. 25, 1951 |

FOREIGN PATENTS

| | | |
|---|---|---|
| 18,418 | Great Britain | of 1892 |